United States Patent
Tsay et al.

(10) Patent No.: US 8,257,076 B2
(45) Date of Patent: Sep. 4, 2012

(54) MULTI-ROD STRUCTURE FOR OPENING AND CLOSING MOLDS

(75) Inventors: Der-min Tsay, Kaohsiung (TW); Hsin-pao Chen, Kaohsiung (TW); Shih-han Chen, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 80 days.

(21) Appl. No.: 13/020,013

(22) Filed: Feb. 3, 2011

(65) Prior Publication Data

US 2011/0287130 A1    Nov. 24, 2011

(30) Foreign Application Priority Data

May 21, 2010    (TW) ................................ 99116306 A

(51) Int. Cl.
  B29C 33/22    (2006.01)
  B29C 49/56    (2006.01)

(52) U.S. Cl. ................... 425/541; 425/451.4; 425/451.5

(58) Field of Classification Search ............... 425/451.4, 425/451.5, 541, 592
See application file for complete search history.

(56) References Cited

U.S. PATENT DOCUMENTS

| | | | | |
|---|---|---|---|---|
| 2,117,400 A * | 5/1938 | Cobb | ............................. | 425/592 |
| 2,233,354 A * | 2/1941 | Thilenius | ....................... | 425/592 |
| 2,975,473 A * | 3/1961 | Hagen et al. | .................... | 425/541 |
| 3,849,049 A * | 11/1974 | Brieschke et al. | .............. | 425/541 |
| 3,877,861 A * | 4/1975 | Kiefer et al. | ...................... | 425/541 |
| 4,801,260 A * | 1/1989 | Oles et al. | ....................... | 425/541 |
| 6,837,699 B2 * | 1/2005 | Jandura | ........................ | 425/451.5 |
| 7,364,422 B2 * | 4/2008 | Canossi | ......................... | 425/541 |
| 8,033,817 B2 * | 10/2011 | Tsay et al. | .................. | 425/451.5 |

FOREIGN PATENT DOCUMENTS

TW    M326468    2/2008

* cited by examiner

Primary Examiner — James Mackey
(74) Attorney, Agent, or Firm — Cheng-Ju Chiang

(57) ABSTRACT

A multi-rod structure for opening and closing molds is provided and includes a single cam, a first side connection rod assembly located on a first side of the cam and having a first side triple connection rod, a first mold actuated by the first side triple connection rod, a linkage connection rod, a second side connection rod assembly located on a second side of the cam and having a second side triple connection rod actuated by the linkage connection rod, and a second mold actuated by the second side triple connection rod. The multi-rod structure only uses the single cam to simultaneously actuate the first and second molds, so that the structure can be simplified, while the vibration, loading, noise and abrasion of components during operation can be relatively reduced.

12 Claims, 4 Drawing Sheets

MULTI-ROD STRUCTURE FOR OPENING AND CLOSING MOLDS

FIELD OF THE INVENTION

The present invention relates to a multi-rod structure for opening and closing molds, and more particularly to a multi-rod structure for opening and closing molds, which is used to simplify the multi-rod structure, reduce the abrasion of a cam and elongate the lifetime of the cam.

BACKGROUND OF THE INVENTION

Nowadays, bottle blow-molding machines are widely applied to fabrications of various plastic bottles (such as PET bottles). A traditional bottle blow-molding machine comprises various different mechanical parts, such as a structure for opening and closing molds, a structure for feeding material and blowing bottles, a structure for ejecting bottles, a structure for conveying and etc., wherein the structure for opening and closing molds can be designed and driven by selectively using various different power sources (such as motor, pneumatic cylinder, hydraulic cylinder or cam).

For example, Taiwan Utility Model Patent No. M326468 discloses a "Mechanism for Opening and Closing Molds of Bottle Blow-Molding Machine", wherein a machine base of a bottle blow-molding machine is provided with two opposite mold bases which can horizontally slide back and forth, and each of the mold bases is linked to the machine base through a toggle assembly. Each of the two toggle assemblies is pivotally connected to a first connection rod assembly which is driven by a first cam and a second cam of a cam assembly, respectively. Thus, the two mold bases can be simultaneously driven to be opened or closed. Furthermore, a lower mold base which can longitudinally slide back and forth is linked to a second connection rod assembly which is driven by a third cam of the cam assembly. Thus, the lower mold base can be simultaneously driven to be opened or closed.

However, there are some problems existing in the actual use of the traditional mechanism for opening and closing molds, as follows: during opening or closing the mold bases, a downward push force fed back from the mold bases and connection rods of the first connection rod assemblies will directly abut against each of the cam surfaces on the cam assembly. After the cam surfaces are long-term used and worn, the precision of the first connection rod assemblies for pushing the two mold bases to close will be affected. In other words, when closing the mold bases, a gap may exist between two contact surfaces of the two mold bases, so as to affect the yield of subsequently feeding material and blowing bottles. Moreover, because the downward push force from the connection rods of the first connection rod assemblies during opening the mold bases will directly abut against each of the cam surfaces on the cam assembly, the cam assembly needs a greater rotation power to push the connection rods of the first connection rod assemblies for opening the mold bases. Meanwhile, the excess push loading transmitted through the connection rods may cause the bending of the connection rods or the pivotal vibrations, noise or abrasion on various pivotal points. In addition, for simultaneously driving the two first connection rod assemblies and the second connection rod assembly, the cam assembly must have three types of different cams, and thus the purchase cost of the cam assembly will be increased. Besides, if installation angles between the three cams are changed, the mold opening and closing operations of the two mold bases and the lower mold base will be affected and can not coordinate with each other, resulting in affecting the yield of subsequently feeding material and blowing bottles. Furthermore, the cam assembly belongs to one of components having higher cost, so that the abrasion of the cam assembly will cause higher maintenance and replacement cost.

As a result, it is necessary to provide a multi-rod structure for opening and closing molds to solve the problems existing in the conventional technologies, as described above.

SUMMARY OF THE INVENTION

A primary object of the present invention is to provide a multi-rod structure for opening and closing molds, wherein a first mold at a first side of a cam is actuated by a first side triple connection rod of a first side connection rod assembly, while a second side triple connection rod of a second side connection rod assembly and a second mold at a second side of the cam are actuated by a linkage connection rod. The multi-rod structure only uses the single cam to simultaneously actuate the first and second molds, so that the structure of the cam can be simplified; the vibration, loading, noise and abrasion of components during operation can be relatively reduced; the operational speed and productivity of the multi-rod structure can be enhanced; the lifetime of the multi-rod structure can be elongated; and the maintenance and replacement rate of the multi-rod structure can be lowered.

A secondary object of the present invention is to provide a multi-rod structure for opening and closing molds, wherein a plurality of connection rods of a connection rod assembly are arranged along a common vertical line in the mold opening operation (or the mold closing operation), while an included angle is defined between the vertical line and an extension line defined by a cam follower and a following connection rod. Thus, during the mold opening operation (or the mold closing operation), it can prevent a downward push force fed back from the reciprocally longitudinal swing of the connection rod assembly from completely focusing on and transmitting to a cam follower and a cam. In other words, the abrasion problem of the cam due to tightly abutment between the cam follower and a cam surface will be relatively reduced. Thus, it is advantageous to reduce the abrasion of the cam surface, elongate the lifetime of the cam, ensure the precision of mold closing operation, and increase the yield of bottle blow-molding.

To achieve the above object, the present invention provides a multi-rod structure for opening and closing molds, which comprises: a cam rotating to generate a driving power; a cam follower actuated by the cam to linearly move back and forth; a first side connection rod assembly actuated by the cam follower to swing and having a first side triple joint connection rod; a first mold actuated by the first side triple joint connection rod of the first side connection rod assembly to linearly move back and forth; a linkage connection rod actuated by the first side triple joint connection rod of the first side connection rod assembly to swing; a second side connection rod assembly actuated by the linkage connection rod to swing and having a second side triple joint connection rod; and a second mold actuated by the second side triple joint connection rod of the second side connection rod assembly to linearly move back and forth; wherein the second mold cooperates with the corresponding first mold which linearly moves back and forth opposite to the second mold, so that the second mold is close to or away from the first mold for carrying out a mold closing operation or a mold opening operation.

In one embodiment of the present invention, the first side connection rod assembly further comprises a pivotal connection rod, a push connection rod and a support connection rod;

and wherein the pivotal connection rod is pivotally connected to a pivotal base, the support connection rod is pivotally connected to a first support base, the pivotal connection rod has a following pivotal point pivotally connected to the cam follower, the pivotal connection rod is actuated by the cam follower to pivotally rotate, so that the push connection rod then longitudinally pushes (or pulls) the support connection rod and the first side triple joint connection rod which thus actuates the first mold to carry out the mold opening operation (or the mold closing operation).

In one embodiment of the present invention, the first side triple joint connection rod has a push pivotal point, a linkage pivotal point and a mold pivotal point; and wherein the push pivotal point is pivotally connected to the support connection rod and the push connection rod, the linkage pivotal point is pivotally connected to the linkage connection rod, and the mold pivotal point is pivotally connected to the first mold.

In one embodiment of the present invention, the cam follower has a following connection rod to be pivotally connected to the following pivotal point of the pivotal connection rod.

In one embodiment of the present invention, the pivotal connection rod and the push connection rod are longitudinally arranged along a common first vertical line in the mold closing operation (or the mold opening operation).

In one embodiment of the present invention, an included angle is defined between the first vertical line and an extension line defined by the cam follower and the following connection rod.

In one embodiment of the present invention, the first side connection rod assembly further comprises a pivotal connection rod, a sliding connection rod, a push connection rod and a support connection rod; and wherein the pivotal connection rod is pivotally connected to a pivotal base, the support connection rod is pivotally connected to a first support base, the pivotal connection rod has a following pivotal point pivotally connected to the cam follower, the sliding connection rod has a first end pivotally connected to the pivotal connection rod and a second end pivotally connected to the push connection rod through a push slider, the pivotal connection rod is actuated by the cam follower to pivotally rotate, so that the sliding connection rod and the push connection rod then longitudinally push (or pull) the support connection rod and the first side triple joint connection rod which thus actuates the first mold to carry out the mold opening operation (or the mold closing operation).

In one embodiment of the present invention, the second side connection rod assembly further comprising a mold connection rod, and the second side triple joint connection rod is actuated by the linkage connection rod to pivotally rotate, so as to longitudinally push (or pull) the mold connection rod which thus actuates the second mold to carry out the mold opening operation (or the mold closing operation).

In one embodiment of the present invention, the second side triple joint connection rod has a pivotal fulcrum, a linkage pivotal point and a mold pivotal point; and wherein the pivotal fulcrum is pivotally connected to a second support base, the linkage pivotal point is pivotally connected to the linkage connection rod, and the mold pivotal point is pivotally connected to the mold connection rod.

In one embodiment of the present invention, the multi-rod structure is a structure for opening and closing molds of a bottle blow-molding machine.

In one embodiment of the present invention, the support connection rod and the push pivotal point and the mold pivotal point of the first side triple joint connection rod are transversely disposed at a common horizontal extension line in the mold closing operation (or the mold opening operation).

In one embodiment of the present invention, the mold connection rod and the mold pivotal point and the pivotal fulcrum of the second side triple joint connection rod are transversely disposed at a common horizontal extension line in the mold closing operation (or the mold opening operation).

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
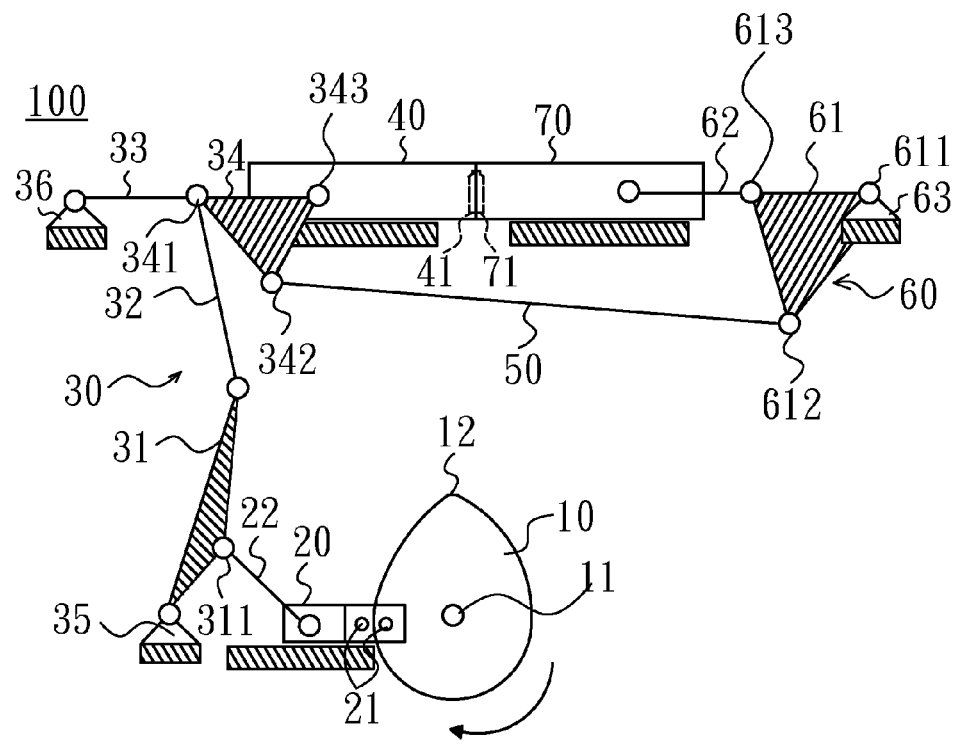
FIG. 1 is a schematic view of a mold closing operation of a multi-rod structure for opening and closing molds according to a first embodiment of the present invention.
Figure 2:
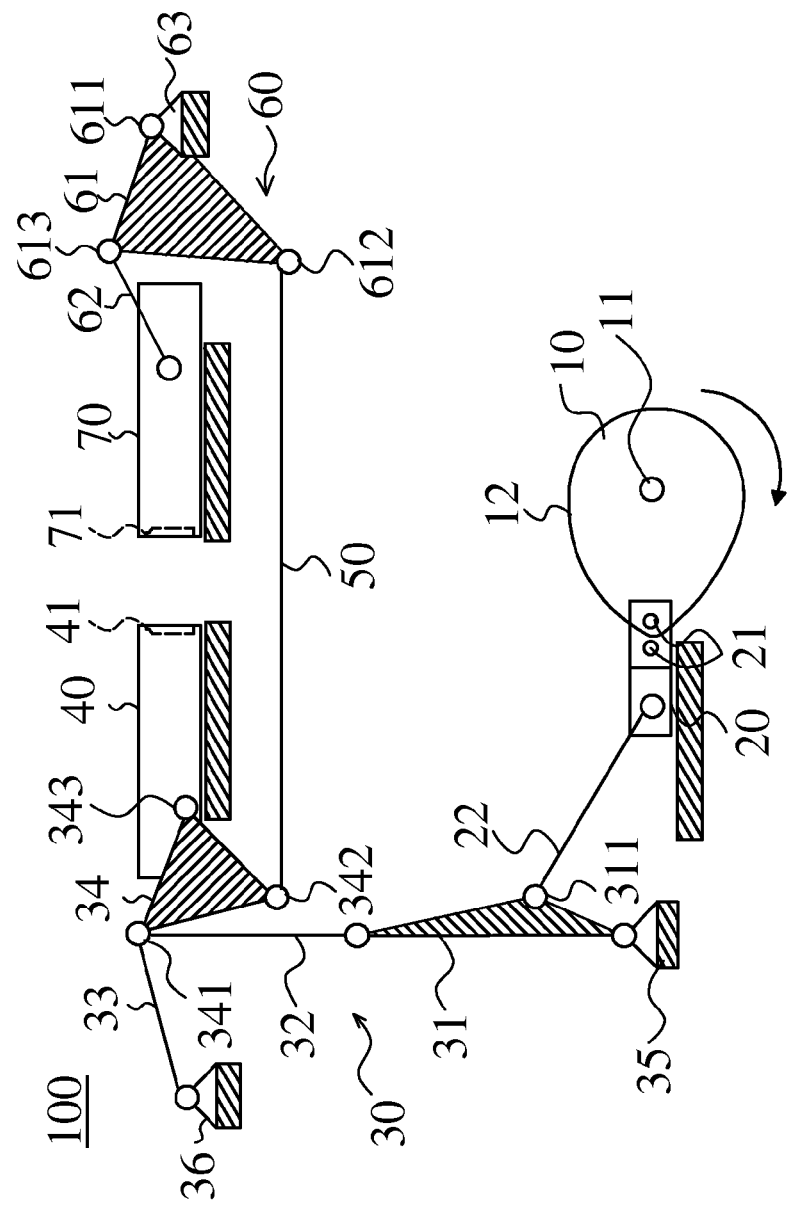
FIG. 2 is a schematic view of a mold opening operation of the multi-rod structure for opening and closing molds according to the first embodiment of the present invention.

Referring now to FIGS. 1 and 2, a first embodiment of the present invention discloses a multi-rod structure for opening and closing molds 100 which is mainly applied to a bottle blow-molding machine for mass production of various plastic bottles, such as PET (polyethylene terephthalate) bottles and etc. As shown in FIG. 1, the structure for opening and closing molds 100 comprises: a cam 10, a cam follower 20, a first side connection rod assembly 30, a first mold 40, a linkage connection rod 50, a second side connection rod assembly 60 and a second mold 70.

In the present invention, it should be noted that the term "pivotal connection" described hereinafter is used to define that a connection relationship between a first component and a second component is a pivotal connection relationship, wherein the first component can rotate within a predetermined angle in relation to the second component. Meanwhile, the term "connection rod" is used to define that a rod-like or polygonal component has at least two pivotal points for being pivotally connected to another component (such as a connection rod, a mold or a follower), a pivotal base and etc. Furthermore, various directional terms described by the present invention, such as upper, lower, front, back, left, right, inner, outer, longitudinal, transverse, vertical, horizontal, side and etc., are only directions based on structures in the accompanying drawings.

For example, the terms "first side" and "second side" described in the present invention hereinafter are used to define the relative positions of a left side and a right side of the cam 10 in each of the accompanying drawings, i.e. a left side close to the first mold 40 and a right side close to the second mold 70, respectively, wherein the terms "first side" and "second side" or the foregoing other directional terms are only used to describe and understand the installation relationship of related components of the present invention, but the present invention is not limited thereto.

Figure 1A:
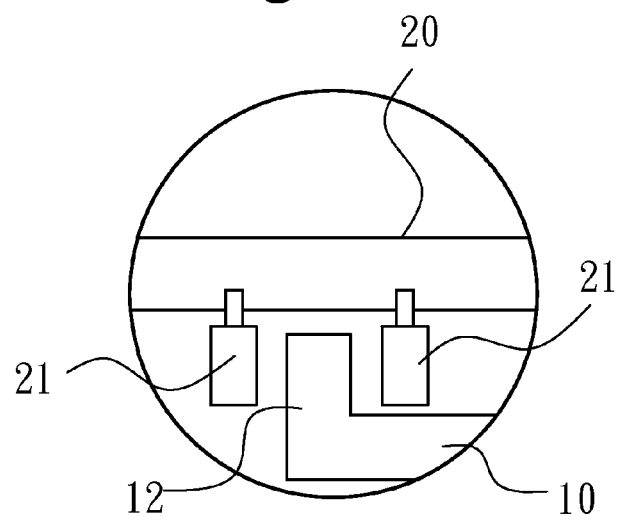
FIG. 1A is a partially enlarged cross-sectional view of FIG. 1 according to the first embodiment of the present invention.

Referring now to FIGS. 1 and 1A, in the first embodiment of the present invention, the cam 10 is made of wear-resistant metal or alloy material, and the cam 10 is mounted on a shaft 11, wherein the shaft 11 is actuated by an external power source (such as a driving motor), so as to rotate and thus generate a driving power. As shown in the partially enlarged cross-sectional view of FIG. 1A, the cam 10 can be an integral one-piece cam or an assembled multi-piece cam. According to the configuration, the cam 10 can be a rib cam, a grooved cam, a planar cam or any other type of equivalent cam. The number of the cam 10 is preferably one, but also can be two or more. Furthermore, in the embodiment, the cam follower 20 is a slide block which can be actuated by the cam 10 to linearly and transversely move back and forth along a track (unlabeled) on a machine base of the structure for opening and closing molds 100.

As shown in the partially enlarged cross-sectional view of FIG. 1A, the cam 10 is preferably a rib cam which has a cross-section preferably having a shallow dish profile for providing a flange 12, wherein inner and outer surfaces of the flange 12 has a predetermined non-circular cam profile. The cam follower 20 preferably has a pair of rollers 21 to commonly clamp the flange 21 of the cam 10. Thus, when the cam 10 rotates, the cam 10 can actuate the cam follower 20 to linearly move back and forth along the track. Furthermore, the cam follower 20 further comprises a following connection rod 22, wherein the following connection rod 22 has a first end pivotally connected to a pivotal point (unlabeled) of the cam follower 20 and a second end used for actuating the first side connection rod assembly 30 to swing (i.e. pivotally rotate within a predetermined angle).

Referring now to FIGS. 1 and 2, in the first embodiment of the present invention, the first side connection rod assembly 30 comprises a pivotal connection rod 31, a push connection rod 32, a support connection rod 33 and a first side triple connection rod 34; wherein the pivotal connection rod 31 has a first end pivotally connected to a pivotal base 35 and a second end pivotally connected to a first end of the push connection rod 32; the support connection rod 33 has a first end pivotally connected to a first support base 36 and a second end pivotally connected to the push connection rod 32 and the first side triple connection rod 34, respectively; the pivotal connection rod 31 is actuated by the cam follower 20 to pivotally rotate, so that the push connection rod 32 then longitudinally pushes (or pulls) the support connection rod 33 and the first side triple joint connection rod 34 which thus actuates the first mold to carry out the mold opening operation (or the mold closing operation).

For more details, in the embodiment, the pivotal connection rod 31 is a substantially triangular plate or a connection rod assembly constructed by a plurality of components, wherein the pivotal connection rod 31 has a following pivotal point 311 pivotally connected to the second end of the following connection rod 22 of the cam follower 20. Thus, the following connection rod 22 can push (or pull) the pivotal connection rod 31 to pivotally rotate within a predetermined angle (such as an optional angle between 15 degree and 60 degree) in relation to the pivotal base 35.

Moreover, the first side triple joint connection rod 34 is also a substantially triangular plate or a connection rod assembly constructed by a plurality of components, wherein the first side triple joint connection rod 34 has a push pivotal point 341, a linkage pivotal point 342 and a mold pivotal point 343, all of which are preferably located at three corners of the triangular plate, but the relative positions of the foregoing points are not limited thereto. The push pivotal point 341 is pivotally connected to the support connection rod 33 and the push connection rod 32, the linkage pivotal point 342 is pivotally connected to the linkage connection rod 50, and the mold pivotal point 343 is pivotally connected to the first mold 40. The linkage pivotal point 343 is pivotally connected to the linkage connection rod 50 for actuating the linkage connection rod 50 to swing.

Referring now to FIGS. 1 and 2, in the first embodiment of the present invention, the first mold 40 has a first mold cavity 41 having a cavity profile designed according to specifications of to-be-blow-molded plastic bottles. The first mold 40 is pivotally connected to the mold pivotal point 343 of the first side triple joint connection rod 34. As shown in FIG. 1, when the support connection rod 33 and the first side triple joint connection rod 34 are pulled downward by the pivotal connection rod 31 and the push connection rod 32, the support connection rod 33 and the push pivotal point 341 and the mold pivotal point 343 of the first side triple joint connection rod 34 are transversely disposed at a common horizontal extension line, wherein the first side triple joint connection rod 34 actuates the first mold 40 to horizontally and transversely move to carry out a mold closing operation.

On the other hand, referring now to FIG. 2, when the support connection rod 33 and the first side triple joint connection rod 34 are pushed upward by the pivotal connection rod 31 and the push connection rod 32, the support connection rod 33 and the first side triple joint connection rod 34 are pivotally rotated in relation to each other at a predetermined angle which may be greater than, equal to or smaller than 90 degree. Thus, the first side triple joint connection rod 34 actuates the first mold 40 to horizontally and transversely move to carry out a mold opening operation.

In the mold opening operation, the push connection rod 32 and the pivotal connection rod 31 are preferably longitudinally arranged along a common first vertical line in turn. Meanwhile, an included angle is defined between the first vertical line and an extension line defined by the cam 10, the cam follower 20 and the following connection rod 22. Thus, during the mold opening/closing operation, the foregoing design can disperse a downward push force fed back from the reciprocally longitudinal swing of the first side connection rod assembly 30 toward the pivotal base 35 and the first support base 36, so as to prevent from excessively and transversely transmitting to the following connection rod 22, the cam follower 20 and the cam 10 along the extension line. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Referring now to FIGS. 1 and 2, in the first embodiment of the present invention, the linkage connection rod 50 is substantially disposed above the cam 10 and the cam follower 20, and disposed below the first mold 40 and the second mold 70. The linkage connection rod 50 has a first end pivotally connected to the linkage pivotal point 342 of the first side triple connection rod 34 of the first side connection rod assembly 30, and a second end pivotally connected to the second side connection rod assembly 60. The linkage connection rod 50 is actuated by the first side triple connection rod 34 of the first side connection rod assembly 30 to swing for driving the second side connection rod assembly 60 to correspondingly swing.

Referring now to FIGS. 1 and 2, in the first embodiment of the present invention, the second side connection rod assembly 60 comprises a second side triple joint connection rod 61 and a mold connection rod 62; and wherein the second side triple joint connection rod 61 is actuated by the linkage connection rod 50 to pivotally rotate for then longitudinally pushing (or pulling) the mold connection rod 62 which thus actuates the second mold 70 to carry out the mold opening operation (or the mold closing operation).

For more details, in the embodiment, the second side triple joint connection rod 61 is a substantially triangular plate or a connection rod assembly constructed by a plurality of components, wherein the second side triple joint connection rod 61 has a pivotal fulcrum 611, a linkage pivotal point 612 and a mold pivotal point 613, all of which are preferably located at three corners of the triangular plate. Furthermore, the pivotal fulcrum 611 is pivotally connected to a second pivotal base 63, the linkage pivotal point 612 is pivotally connected to the second end of the linkage connection rod 50, and the mold pivotal point 613 is pivotally connected to the second end of the mold connection rod 62. Thus, the linkage connection rod 50 can push (or pull) the second side triple joint connection rod 61 to pivotally rotate within a predetermined angle (such as an optional angle between 15 degree and 60 degree without limitation) in relation to the pivotal fulcrum 611 and the second pivotal base 63, so that the second side triple joint connection rod 61 can be actuated to be pushed upward (or pulled downward). As a result, the mold connection rod 62 of the second side triple joint connection rod 61 can actuate the mold connection rod 62 and the second mold 70, so that the second mold 70 can horizontally and transversely move back and forth for carrying out the mold closing operation or the mold opening operation.

Referring now to FIGS. 1 and 2, in the first embodiment of the present invention, the second mold 70 has a second mold cavity 71 having a cavity profile designed according to specifications of to-be-blow-molded plastic bottles. The second mold cavity 71 is corresponding to the first mold cavity 41 of the first mold 40, and the second mold 70 is pivotally connected to the second end of the mold connection rod 62. As shown in FIG. 1, when the second side triple joint connection rod 61 and the mold connection rod 62 are pulled downward by the linkage connection rod 50, the mold connection rod 62 and the mold pivotal point 613 and the pivotal fulcrum 611 of the second side triple joint connection rod 61 are transversely disposed at a common horizontal extension line in turn, wherein the mold connection rod 62 actuates the second mold 70 to horizontally and transversely move to carry out a mold closing operation.

On the other hand, referring now to FIG. 2, when the second side triple joint connection rod 61 and the mold connection rod 62 are pushed upward by the linkage connection rod 50, the second side triple joint connection rod 61 and the mold connection rod 62 are pivotally rotated in relation to each other at a predetermined angle which may be greater than, equal to or smaller than 90 degree. Thus, the mold connection rod 62 actuates the second mold 70 to horizontally and transversely move to carry out a mold opening operation.

Referring now to FIGS. 1 and 2, according to the multi-rod structure for opening and closing molds 100 in the first embodiment of the present invention, the first mold 40 at the first side of the cam 10 is actuated by the first side triple connection rod 34 of the first side connection rod assembly 30, while the second side triple joint connection rod 61 of the second side connection rod assembly 60 and the second mold 70 at the second side of the cam are actuated by the linkage connection rod 50. The foregoing multi-rod structure only uses the single cam 10 to simultaneously actuate the first and second molds 40, 70, so that the structure of the cam 10 can be simplified; the vibration, loading, noise and abrasion of components during operation can be relatively reduced; the operational speed and productivity of the multi-rod structure can be enhanced; the lifetime of the multi-rod structure can be elongated; and the maintenance and replacement rate of the multi-rod structure can be lowered.

Figure 3:
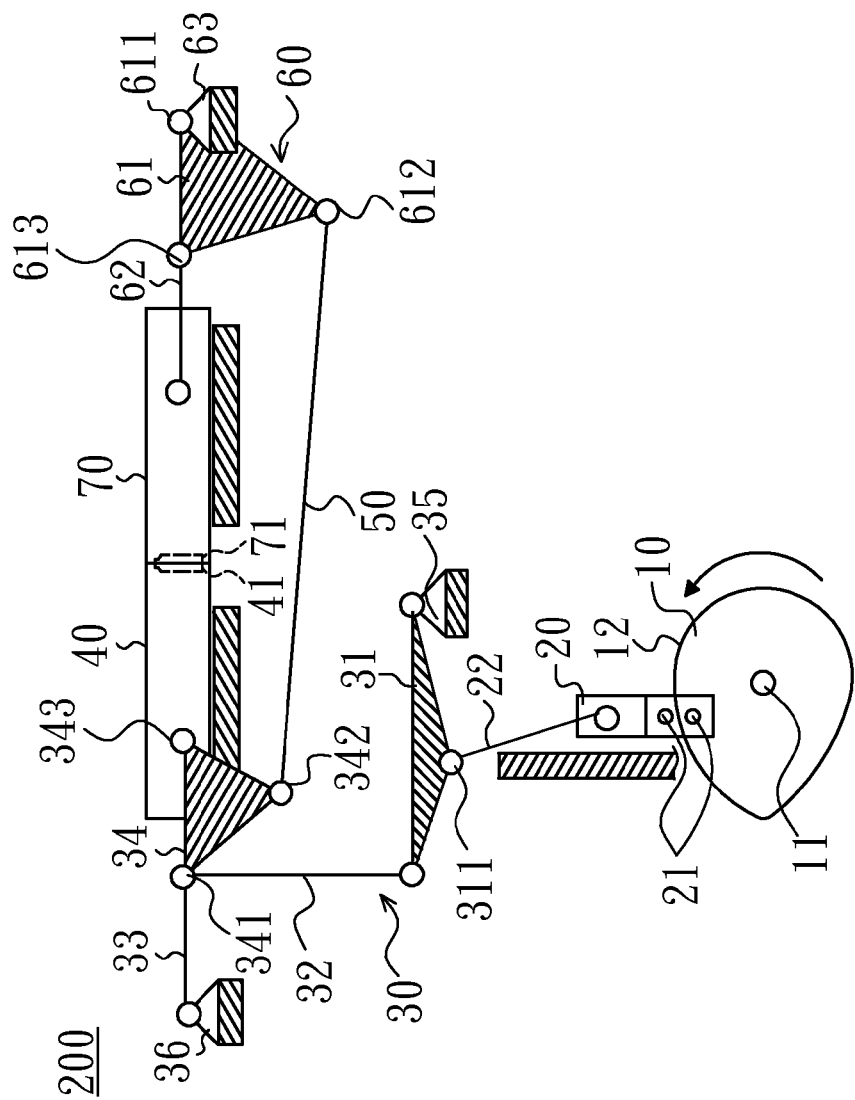
FIG. 3 is a schematic view of a mold closing operation of a multi-rod structure for opening and closing molds according to a second embodiment of the present invention.

Referring now to FIG. 3, a multi-rod structure for opening and closing molds according to a second embodiment of the present invention is illustrated and similar to the first embodiment, so that the second embodiment uses similar terms and numerals of the first embodiment. As shown, the difference of the second embodiment is that: a multi-rod structure for opening and closing molds 200 of the second embodiment comprises a first side connection rod assembly 30 which similarly comprises a pivotal connection rod 31, a push connection rod 32, a support connection rod 33, a first side triple connection rod 34, a pivotal base 35 and a first support base 36, wherein the pivotal connection rod 31 and the pivotal base 35 are further transversely disposed along a closely horizontal direction, and the push connection rod 32 is still longitudinally disposed along a closely vertical direction.

As shown in FIG. 3, in the second embodiment, when the support connection rod 33 and the first side triple joint connection rod 34 are pulled downward by the pivotal connection rod 31 and the push connection rod 32, the support connection rod 33 and the push pivotal point 341 and the mold pivotal point 343 of the first side triple joint connection rod 34 are transversely disposed at a common horizontal extension line, wherein the first side triple joint connection rod 34 actuates the first mold 40 to horizontal and transversely move for carrying out a mold closing operation. At the same time, the pivotal connection rod 31 and the push connection rod 32 commonly define an included angle therebetween, wherein the included angle is close to 90 degree.

On the other hand, when the pivotal connection rod 31 is pushed upward by the following connection rod 22 to pivotally rotate upward at a predetermined angle (such as an optional angle between 15 degree and 60 degree) in relation to the pivotal base 35, the push connection rod 32 will longitudinally push upward the support connection rod 33 and the first side triple joint connection rod 34, so as to carry out a mold opening operation (not-shown) similar to that of the first embodiment.

Thus, in the embodiment, during the mold opening/closing operation, the foregoing design of the first side connection rod assembly 30 can disperse a downward push force fed back from the reciprocally longitudinal swing of the first side connection rod assembly 30 toward the pivotal base 35 and the first support base 36, so as to prevent from excessively and longitudinally transmitting to the following connection rod 22, the cam follower 20 and the cam 10 along a vertical line through the pivotal connection rod 31 which is horizontally and transversely disposed. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Figure 4:
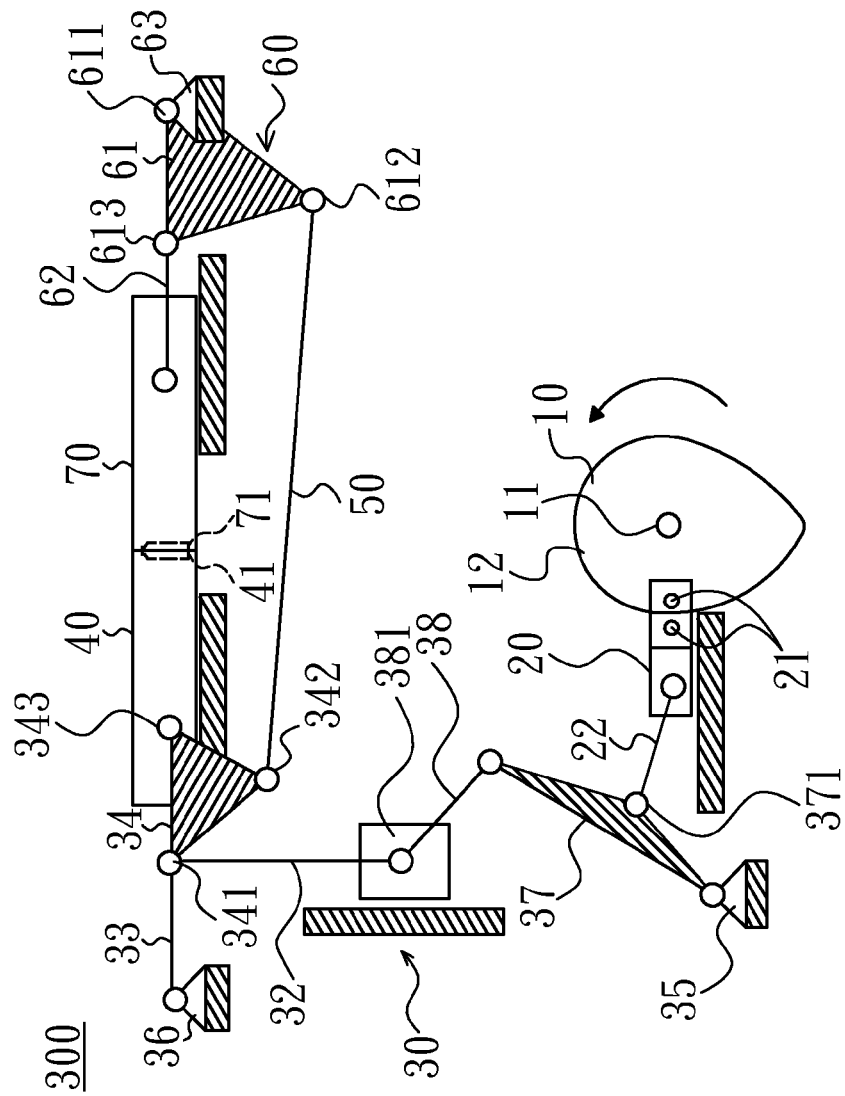
FIG. 4 is a schematic view of a mold closing operation of a multi-rod structure for opening and closing molds according to a third embodiment of the present invention.

Referring now to FIG. 4, a multi-rod structure for opening and closing molds according to a third embodiment of the present invention is illustrated and similar to the first embodiment, so that the third embodiment uses similar terms and numerals of the first embodiment. As shown, the difference of the third embodiment is that: the first side connection rod assembly 30 of a multi-rod structure for opening and closing molds 300 of the third embodiment further comprises a pivotal connection rod 37, a sliding connection rod 38, a push connection rod 32, a support connection rod 33 and a first side triple connection rod 34, wherein the structure for opening and closing molds 300 comprises the pivotal connection rod 37 and further comprises the sliding connection rod 38 pivotally connected between the pivotal connection rod 37 and the push connection rod 32. The pivotal connection rod 37 is pivotally connected to a pivotal base 35, and the pivotal connection rod 37 has a following pivotal point 371 to pivotally connect the following connection rod 22 of the cam follower 2. The sliding connection rod 38 has a first end pivotally connected to the pivotal connection rod 37 and a second end pivotally connected to the push connection rod 32 through a push slider 381. The push slider 381 can longitudinally move back and forth along a track (unlabeled) on the machine base of the structure for opening and closing molds 300. Furthermore, the support connection rod 33 is pivotally connected to the first support base 36, and the first side triple connection rod 34 is the same as the corresponding structure in the first embodiment.

As shown in FIG. 4, in the third embodiment, when the support connection rod 33 and the first side triple joint connection rod 34 are pulled downward by the pivotal connection rod 37, the sliding connection rod 38 and the push connection rod 32, the support connection rod 33 and the push pivotal point 341 and the mold pivotal point 343 of the first side triple joint connection rod 34 are transversely disposed at a common horizontal extension line in turn, wherein the first side triple joint connection rod 34 actuates the first mold 40 to horizontally and transversely for carrying out a mold closing operation. Meanwhile, the second side triple joint connection rod 61 and the mold connection rod 62 actuates the second mold 70 to carry out a mold closing operation, wherein the principle of the mold closing operation is the same as that of the first embodiment.

On the other hand, when the support connection rod 33 and the first side triple joint connection rod 34 are pushed upward by the sliding connection rod 38 and the push connection rod 32, the support connection rod 33 and the first side triple joint connection rod 34 are pivotally rotated in relation to each other at a predetermined angle greater than 90 degree, so that the first side triple joint connection rod 34 actuates the first mold 40 to carry out a mold opening operation (not-shown). Meanwhile, the second side triple joint connection rod 61 and the mold connection rod 62 actuates the second mold 70 to carry out a mold opening operation, wherein the principle of the mold opening operation is the same as that of the first embodiment.

In the mold opening operation, the push connection rod 32, the sliding connection rod 38 and the pivotal connection rod 37 are preferably longitudinally arranged along a common first vertical line (not-shown) in turn. Meanwhile, an included angle are defined between the first vertical line and a closely horizontal extension line (not-shown) defined by the cam 10, the cam follower 20 and the following connection rod 22. Thus, during the mold opening/closing operation, the foregoing design can disperse a downward push force fed back from the reciprocally longitudinal swing of the first side connection rod assembly 30 toward the push slider 381, the pivotal base 35 and the first support base 36, so as to prevent from excessively and transversely transmitting to the following connection rod 22, the cam follower 20 and the cam 10 along the horizontal extension line. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

As described above, in comparison with the traditional structure for opening and closing molds which has too many cam surfaces and each of the cam surfaces easily lose the mold closing precision after long term use to affect the yield of subsequently feeding material and blowing bottles, the multi-rod structure for opening and closing molds 100 of the present invention as shown in FIGS. 1 to 4 is to actuate the first mold 40 at the first side of the cam 10 by the first side triple connection rod 34 of the first side connection rod assembly 30 and to actuate the second side triple connection rod 61 of second side connection rod assembly 60 and the second mold 70 at the second side of the cam 10 by the linkage connection rod 50. The multi-rod structure only uses the single cam 10 to simultaneously actuate the first and second molds 40, 70, so that the structure of the cam 10 can be simplified; the vibration, loading, noise and abrasion of components during operation can be relatively reduced; the operational speed and productivity of the multi-rod structure can be enhanced; the lifetime of the multi-rod structure can be elongated; and the maintenance and replacement rate of the multi-rod structure can be lowered.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A multi-rod structure for opening and closing molds, comprising:
    a cam rotating to generate a driving power;
    a cam follower actuated by the cam to linearly move back and forth;
    a first side connection rod assembly actuated by the cam follower to swing and having a first side triple joint connection rod;
    a first mold actuated by the first side triple joint connection rod of the first side connection rod assembly to linearly move back and forth;
    a linkage connection rod actuated by the first side triple joint connection rod of the first side connection rod assembly to swing;
    a second side connection rod assembly actuated by the linkage connection rod to swing and having a second side triple joint connection rod; and
    a second mold actuated by the second side triple joint connection rod of the second side connection rod assembly to linearly move back and forth;
    wherein the second mold cooperates with the corresponding first mold which linearly moves back and forth opposite to the second mold, so that the second mold is close to or away from the first mold for carrying out a mold closing operation or a mold opening operation.

2. The multi-rod structure for opening and closing molds according to claim 1, wherein the first side connection rod assembly further comprises a pivotal connection rod, a push connection rod and a support connection rod; and wherein the pivotal connection rod is pivotally connected to a pivotal base, the support connection rod is pivotally connected to a first support base, the pivotal connection rod has a following pivotal point pivotally connected to the cam follower, the pivotal connection rod is actuated by the cam follower to pivotally rotate, so that the push connection rod then longitudinally pushes or pulls the support connection rod and the first side triple joint connection rod which thus actuates the first mold to carry out the mold opening operation or the mold closing operation.

3. The multi-rod structure for opening and closing molds according to claim 2, wherein the first side triple joint connection rod has a push pivotal point, a linkage pivotal point and a mold pivotal point; and wherein the push pivotal point is pivotally connected to the support connection rod and the push connection rod, the linkage pivotal point is pivotally connected to the linkage connection rod, and the mold pivotal point is pivotally connected to the first mold.

4. The multi-rod structure for opening and closing molds according to claim 2, wherein the cam follower has a following connection rod to be pivotally connected to the following pivotal point of the pivotal connection rod.

5. The multi-rod structure for opening and closing molds according to claim 4, wherein the pivotal connection rod and the push connection rod are arranged along a common first vertical line in the mold closing operation or the mold opening operation.

6. The multi-rod structure for opening and closing molds according to claim 5, wherein an included angle is defined between the first vertical line and an extension line defined by the cam follower and the following connection rod.

7. The multi-rod structure for opening and closing molds according to claim 1, wherein the first side connection rod assembly further comprises a pivotal connection rod, a sliding connection rod, a push connection rod and a support connection rod; and wherein the pivotal connection rod is pivotally connected to a pivotal base, the support connection rod is pivotally connected to a first support base, the pivotal connection rod has a following pivotal point pivotally connected to the cam follower, the sliding connection rod has a first end pivotally connected to the pivotal connection rod and a second end pivotally connected to the push connection rod through a push slider, the pivotal connection rod is actuated by the cam follower to pivotally rotate, so that the sliding connection rod and the push connection rod then longitudinally push or pull the support connection rod and the first side triple joint connection rod which thus actuates the first mold to carry out the mold opening operation or the mold closing operation.

8. The multi-rod structure for opening and closing molds according to claim 1, wherein the second side connection rod assembly further comprising a mold connection rod, and the second side triple joint connection rod is actuated by the linkage connection rod to pivotally rotate, so as to longitudinally push or pull the mold connection rod which thus actuates the second mold to carry out the mold opening operation or the mold closing operation.

9. The multi-rod structure for opening and closing molds according to claim 8, wherein the second side triple joint connection rod has a pivotal fulcrum, a linkage pivotal point and a mold pivotal point; and wherein the pivotal fulcrum is pivotally connected to a second support base, the linkage pivotal point is pivotally connected to the linkage connection rod, and the mold pivotal point is pivotally connected to the mold connection rod.

10. The multi-rod structure for opening and closing molds according to claim 1, wherein the multi-rod structure is a structure for opening and closing molds of a bottle blow-molding machine.

11. The multi-rod structure for opening and closing molds according to claim 3, wherein the support connection rod and the push pivotal point and the mold pivotal point of the first side triple joint connection rod are transversely disposed at a common horizontal extension line in the mold closing operation or the mold opening operation.

12. The multi-rod structure for opening and closing molds according to claim 9, wherein the mold connection rod and the mold pivotal point and the pivotal fulcrum of the second side triple joint connection rod are transversely disposed at a common horizontal extension line in the mold closing operation or the mold opening operation.

* * * * *